(No Model.) 2 Sheets—Sheet 2.
E. JAGGER.
PORTABLE APPARATUS FOR PLACING COP TUBES UPON THE SPINDLES OF MULES, &c.
No. 459,975. Patented Sept. 22, 1891.
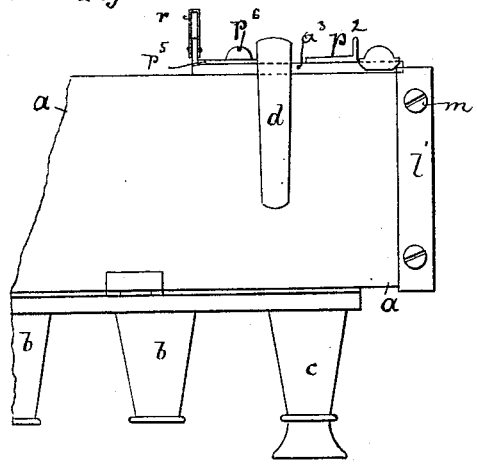
Fig. 9.
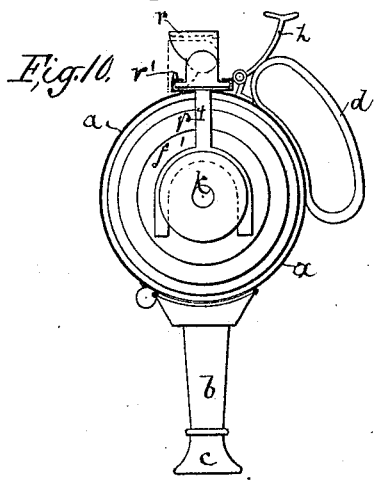
Fig. 10.
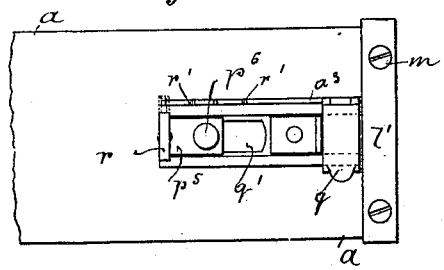
Fig. 11.
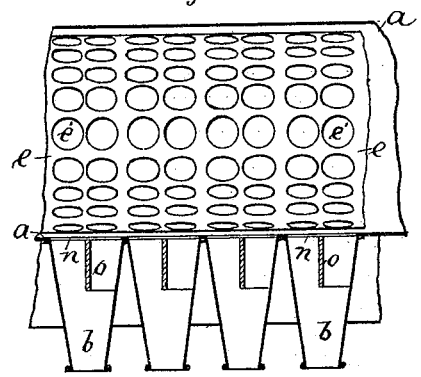
Fig. 13.
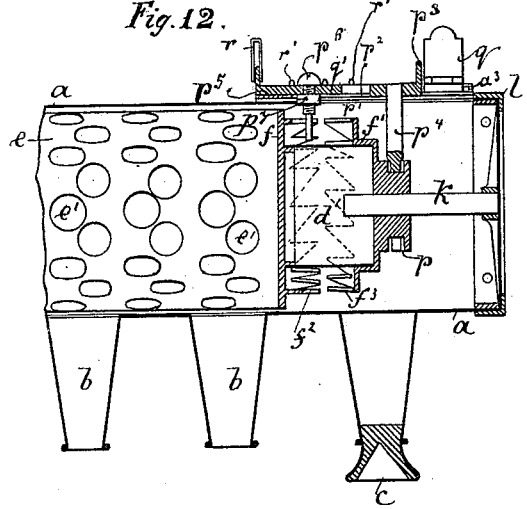
Fig. 12.
Fig. 14.
Witnesses.
Benjamin Wardle.
Thos. A. Fowkes.
Inventor.
Eli Jagger.
by Ferdinand Boshardt
Attorney.

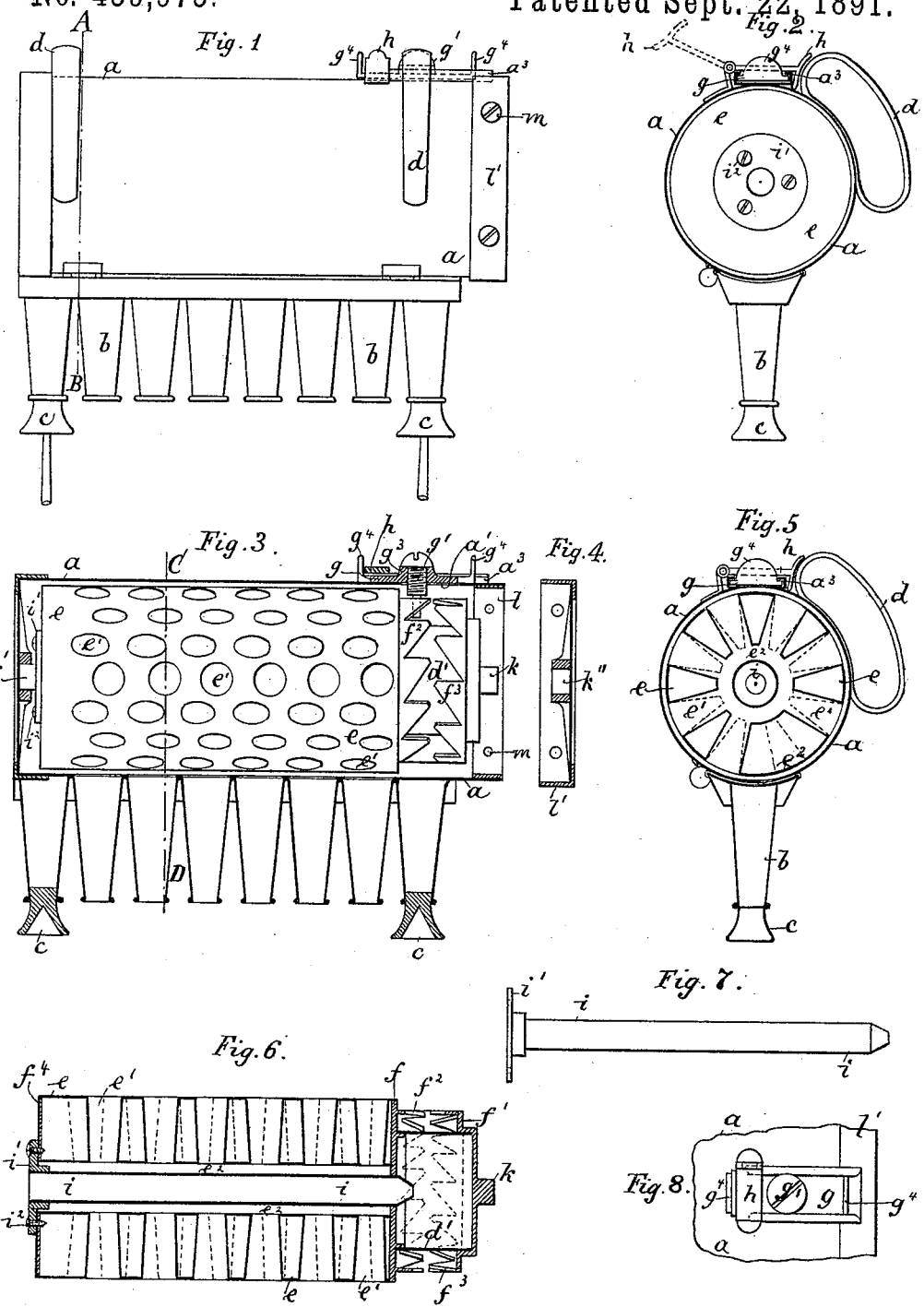

UNITED STATES PATENT OFFICE.

ELI JAGGER, OF OLDHAM, ENGLAND.

PORTABLE APPARATUS FOR PLACING COP-TUBES UPON THE SPINDLES OF MULES, &c.

SPECIFICATION forming part of Letters Patent No. 459,975, dated September 22, 1891.

Application filed July 9, 1888. Serial No. 279,475. (No model.) Patented in Germany February 13, 1887, No. 40,410; in Austria-Hungary February 23, 1887, No. 8,449 and No. 34,628; in England March 9, 1888, No. 3,654; in Belgium May 16, 1888, No. 81,822; in France May 19, 1888, No. 190,685; in Italy June 4, 1888, No. 46/366; in Spain December 10, 1888, No. 8,981, and in Switzerland January 30, 1889, No. 535.

*To all whom it may concern:*

Be it known that I, ELI JAGGER, a subject of the Queen of Great Britain, residing at Oldham, in the county of Lancashire, Kingdom of Great Britain, have invented new and useful improvements in portable apparatus for placing cop-tubes upon the spindles of mules, twiners, ring-frames, and other similar machines, (for which I have obtained a patent in Great Britain, No. 3,654, dated March 9, 1888; in France, No. 190,685, dated May 19, 1888; in Belgium, No. 81,822, dated May 16, 1888; in Germany, No. 40,410, dated February 13, 1887; in Austria-Hungary, No. 8,449 and No. 34,628, dated February 23, 1887; in Italy, No. 46\366, dated June 4, 1888; in Spain, No. 8,981, dated December 10, 1888, and in Switzerland, No. 535, dated January 30, 1889,) of which the following is a specification.

My invention relates to improvements in portable apparatus for placing cop-tubes upon the spindles of mules, twiners, ring-frames, and other similar machines, in which an intermittent rotating cylinder or sliding flat is employed for holding cop-tubes, in conjunction with a suitable number of tapered chutes and guides depending from below the casing or frame in or on which the said cylinder or flat is intermittently rotated or slid by suitable mechanism for the purpose of discharging the cop-tubes through the said tapered chutes onto the spindles of the respective machines.

The objects of my improvements are, in the first place, to improve the mechanism which effects the intermittent rotation of the cylinder by dispensing with the volute spring hitherto used and by providing means whereby the said cylinder is more certain in each action, can be locked in position, and thus prevented from accidentally rotating; second, to make the core in the cylinder on which the cop-tubes rest removable and interchangeable for the purpose of facilitating the cleaning of the interior of the cylinder and adapting the same for various lengths of cop-tubes. I attain these objects by the mechanism illustrated in the accompanying two sheets of drawings, in which—

Figure 1, Sheet I, is a side elevation of the complete apparatus; Fig. 2, a vertical cross-section at the line A B of Fig. 1; Fig. 3, a longitudinal section of the apparatus, showing the cam end of the cylinder-casing removed and the cop-tube cylinder in elevation. Fig. 4 is a vertical section of the cam end detached. Fig. 5 is a vertical cross-section at the line C D of Fig. 3. Fig. 6 is a longitudinal section of the cop-tube cylinder, and Fig. 7 a detached view of the core of the same. Fig. 8 is a plan of the cam-slide. Fig. 9, Sheet II, is a side view; Fig. 10, an end view with the end of the cylinder-casing removed; Fig. 11, a plan, and Fig. 12 a longitudinal section of modification of the cam part of the apparatus. Fig. 13 is a longitudinal section, and Fig. 14 a plan of a portion of the cop tube cylinder and the tapered chutes in connection therewith.

Similar letters refer to similar parts throughout the several figures.

The cylindrical casing $a$, (see Figs. 1 and 2,) with its hinged tapered chutes $b$, guides $c$, and handles $d$, constitutes the frame-work of the apparatus.

In the casing $a$ is placed to rotate intermittently the cop-tube cylinder $e$, (see Figs. 2, 3, 4, 5, and 6,) one end of which is provided with two disks $f$ and $f'$, the disk $f'$ being centrally formed with a pivot $k$ and the disks $f$ and $f'$ with cam-teeth $f^2 f^3$, projecting cylindrically toward each other in such a manner that the incline of each tooth extends past the point of the tooth opposite to it. The disk $f$ is soldered inside the respective end of the cop-tube cylinder $e$ and is formed with a flange, which serves to receive one end of a short tube $d'$, the other end of which fits into the recessed part of the disk $f'$. The tube $d'$ is soldered to the said flange and into the said recess, and serves to connect the two disks $f$ and $f'$ together at the required distance apart. These two circles of teeth form a cam, the number of cam-teeth being made to correspond with the number of rows of cop-tube holes $e'$, which are arranged radially, and the blank space $e^2$, formed in the cylinder $e$. (See Fig. 5.)

Above the cam-teeth $f^2 f^3$ a slot $a'$ is formed in the cylinder-casing $a$, over which a slide $g$ is placed, carrying a stud $g'$, projecting through the said slot $a'$ into the cam-teeth $f^2 f^3$. The slide $g$ is guided over the slot $a'$ in the grooves $a^3$, and in or about its middle is formed with a small boss $g^3$, which serves to receive the aforesaid stud $g'$, and facilitates the sliding of the latter by means of the fingers of the user of the apparatus, each end of the said slide $g$ being also formed with a projection $g^4$.

At one end of the slide $g$ (see Figs. 1, 2, 3, 5, and 8) I secure on the cylinder $a$, preferably hinge-like, a latch or catch $h$, which, when brought over the slide $g$, locks it, and consequently the cylinder $e$, in position, so that no accidental rotation of same can take place, and when raised with the fingers will permit of the slide $g$ being actuated to and fro, which causes an intermittent rotation of the cylinder $e$. The stud $g'$ on leaving one circle of cam-teeth $f^2 f^3$ pushes against the incline of the opposite tooth, thus causing the cylinder $e$ to make a partial turn, and the respective row of cop-tube holes $e'$ to come over the tapered chutes $b$. The stud $g'$ then passes the point of and enters the bottom of the respective tooth, and thereby retains the cylinder $e$ securely in position, while the cop-tubes drop into the tapered chutes $b$ until the motion of the stud $g'$ or slide $g$ is reversed, when the stud $g'$ repeats its action and recommences the intermittent rotation of the cylinder $e$, as described, without the aid of a spring.

I would here remark that the mechanism described for intermittently rotating the cop-tube cylinder can not only be applied to a non-sliding cylinder, but also to a sliding one. In the latter case, however, the sliding of the cylinder takes place simultaneously with the intermittent rotation of the same, and is effected by the same means—viz., the stud $g'$ and cam-teeth $f^2 f^3$.

The core $i$ in the cop-tube cylinder $e$, (see Figs. 2, 5, 6, and 7,) on which the cop-tubes rest, is formed removable and interchangeable, which facilitates the cleaning of the interior of the cop-tube cylinder $e$ and adapts the apparatus for different length of cop-tubes. This feature of my invention I prefer to carry out by forming the cop-tube holes $e'$ in the cylinder $e$, so as to leave a clear space $e^2$ between the core and the inner extremities of the cop-tube holes $e'$, and permit of inserting various diameters of cores $i$. Each end of the cop-tube cylinder $e$ is centrally formed with a hole to admit of the inserting of the core $i$, the latter being tapered on one end, which serves to guide the core $i$ into the end disks $f$ and $f^4$ of the cylinder $e$, the other end of the core $i$ being provided with a flange $i'$, which fits against the respective end of the cop-tube cylinder $e$, and serves to fasten the core to the same by means of screws $i^2$. One end of the cylinder-casing $a$ is soldered to and internally furnished with a pivot $k'$, which enters the respective end of the core $i$.

The end of the cylinder-casing A, (see Figs. 1 and 3,) near the cam of the cylinder $e$, I make removable, so as to facilitate inspection and lubrication of the pivots $k$ and $k'$, on which the cylinder $e$ rotates intermittently. For this purpose I preferably solder a ring $l$ inside the end of the cylinder-casing $a$ and form the end of the cylinder with a flange $l'$ to fit around the cylinder-casing $a$. The flange $l'$ I form with a suitable number of holes, preferably four in number. These holes are made to correspond with tapped holes formed in the cylinder-casing $a$, and the said ring $l$ to receive screws $m$, by means of which the end of the cylinder-casing $a$ is secured to the latter and made readily removable.

The removable cylinder-casing end on its inner side is centrally formed with a pivot-hole $k''$, in which the pivot $k$ of the respective cylinder end rotates.

The cop-tube holes $e'$ in the cylinder $e$ are arranged in double rows—viz., zigzag-like, as shown in Fig. 3—as near together as the material forming the cop-tube holes $e'$ will permit. Each of such double rows of cop-tube holes $e'$ will be opposite to a tapered chute $b$ and discharge its contents into the same on being brought over it.

The same object may be attained by forming the cop-tube holes in the cylinder $e$ as close together as possible, in single rows, (see Fig. 13, Sheet II,) and the upper parts of the tapered chutes $b$ with a division $o$, so as to prevent the cop-tubes from falling crosswise into the tapered chutes $b$, and thereby stopping up the same.

The cylinder-casing $a$, instead of being formed with a longitudinal slot over the tapered chutes $b$, in this case is formed with a zigzag-like or double row of holes $n$, corresponding with the chutes $b$, so that to empty one row of the cop-tube holes $e'$ completely two partial turns of the cop-tube cylinder $e$ are required, each time every alternate cop-tube being permitted to drop through the respective orifice or hole $n$ in the cylinder-casing $a$ into the tapered chute $b$.

In order to utilize as much of the surface of the cylinder $e$ as possible for machines having a wide spindle-gage, and instead of forming double rows of cop-tube holes $e'$, as in Figs. 1, 2, 3, 5, and 6, Sheet I, in the cylinder $e$ apart from each other, according to the spindle-gage, I interpose between the same another double row of cop-tube holes $e'$, (see Fig. 12,) so that after one set of the double rows of cop-tube holes $e'$ has been emptied the second set in the cylinder $e$ can be brought over the tapered chutes $b$. To this end I make the cylinder $e$ capable of sliding on pivots $k$, and form the end which is provided with the cam-teeth $f^2 f^3$ with an annular groove $p$. Above the said cam and groove $p$ I form a slot $p'$ in the cylinder-casing $a$, and place over it a slide $p^2$, guided in the grooves $a^3$ thereon. This slide $p^2$ is formed with a projection $p^3$, and carries a forked stud $p^4$, which passes through the said slot $p'$ and into the annular recess $p$, formed in the respective cylinder end. In conjunction with the said projection $p^3$ a latch or catch $q$ is attached, preferably hinge-like, to the cylinder-casing $a$, which when raised will permit the projection $p^3$ of the slide $p^2$ to pass either to the right or left of it, and when lowered will retain and prevent the slide $p^2$ and cop-tube cylinder $e$ from moving longitudinally, thus retaining either the one or the other set of double rows of cop-tube holes $e'$ in position over the tapered chutes $b$. On the aforesaid slide $p^2$ a supplementary slide $p^5$ is arranged to be actuated to and fro. This last-named slide carries the stud $p^6$, which passes through a slot $q'$, formed in the first-named slide $p^2$, and engages the cam-teeth $f^2 f^3$ or cam of the cylinder $e$, and is provided with a small latch $r$, arranged to hook onto suitable pegs or projections $r'$, formed on the cylinder-casing $a$ for the purpose of preventing the cop-tube cylinder $e$ from rotating accidentally in the various longitudinal positions. The supplementary slide $p^5$ is guided on the first-named slide $p^2$ by screwing the stud $p^6$ through a block $p^7$, arranged to slide in the slot $q'$ and bear against the under side of the first-named slide $p^2$ on each side of its slot $q'$. (See Fig. 12.)

I am aware that prior to my invention apparatus for placing cop-tubes upon the spindles of mules and like machines have been made with a rotating cylinder operating in conjunction with tapered chutes. I therefore do not claim such combination broadly; but

What I claim as my invention, and desire to secure by Letters Patent, is—

1. In apparatus for placing cop-tubes upon the spindles of mules or like machines, the combination, with the cylindrical casing $a$, of the rotating cop-tube cylinder placed inside the said casing and having connected therewith the cylindrical cam consisting of two circles of cam-teeth $f^2 f^3$, pointing toward each other and arranged concentrically with relation to the end of the cop-tube cylinder, and the cam-slide guided to move longitudinally of the cylinder and provided with a stud which passes through the cylinder-casing and acts upon the cam-teeth $f^2 f^3$, as described, whereby on the slide being moved to and fro an intermittent rotation is imparted to the cop-tube cylinder, substantially as and for the purpose set forth.

2. The combination, with the cop-tube cylinder having cam-teeth, substantially as described, of the cylindrical casing, a slide fitted to be moved upon the said casing, a stud carried by the said slide and acting upon the said cam-teeth of the cop-tube cylinder, whereby the cop-tube cylinder may be intermittingly rotated, and a pivoted stop or catch, whereby the slide may be held in position to prevent its to-and-fro movement and the intermittent rotation of the cop-tube cylinder.

3. The combination, with the cop-tube cylinder having cam-teeth, substantially as described, of the cylindrical casing having guides thereon, a slide arranged to be moved to and fro in said guides and having a projection, a stud carried by the said slide and acting upon the cam-teeth of the cop-tube cylinder, whereby the cop-tube cylinder may be intermittingly rotated, and a latch hinged to the cylindrical casing, adapted to be lowered against the side of the projection of the slide, and thereby prevent its to-and-fro movement and the intermittent rotation of the cop-tube cylinder.

4. The cop-tube cylinder $e$, having a removable and interchangeable core $i$, which serves as a rest for the cop-tubes, and one end of which core $i$ is loosely fitted into a disk at one end of the cop-tube cylinder, while the other end is secured to the opposite end of the cop-tube cylinder.

ELI JAGGER.

Witnesses:
FERDINAND BOSSHARDT,
THOS. A. FOULKES.